April 1, 1941.  L. MOLLET  2,236,827
VEHICLE DOOR
Filed June 9, 1937  2 Sheets-Sheet 1
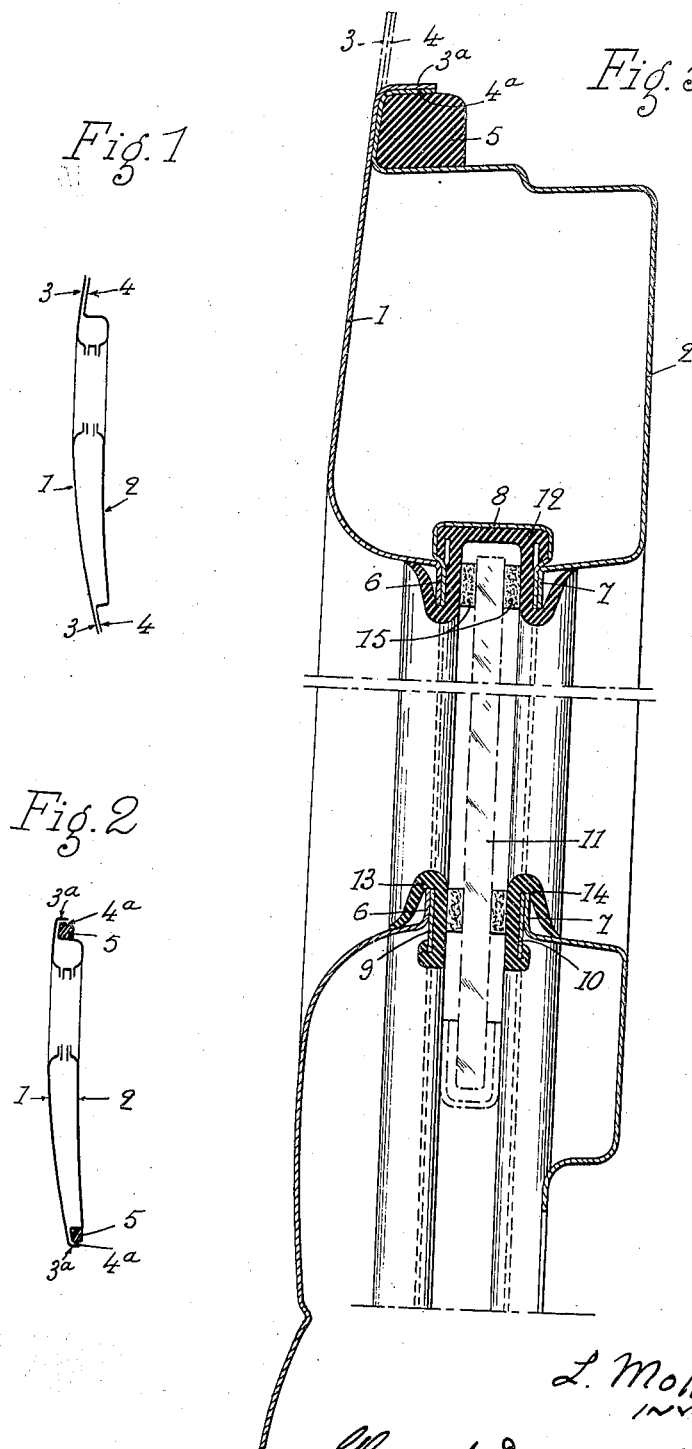

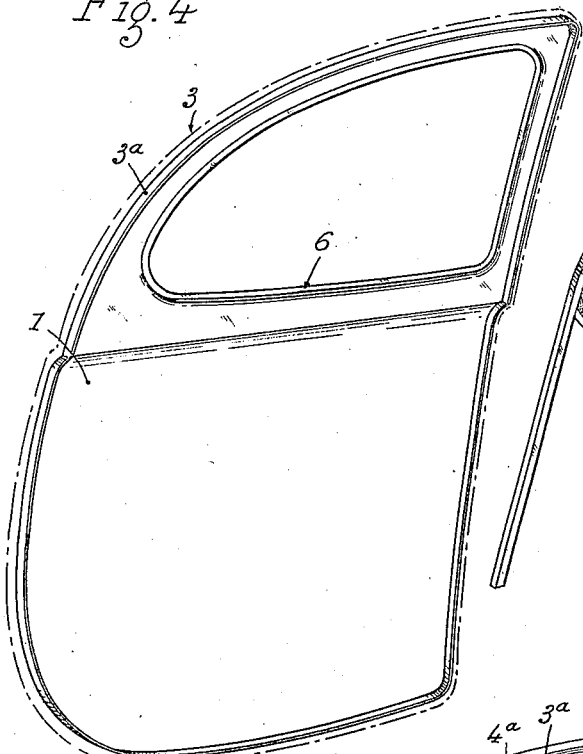
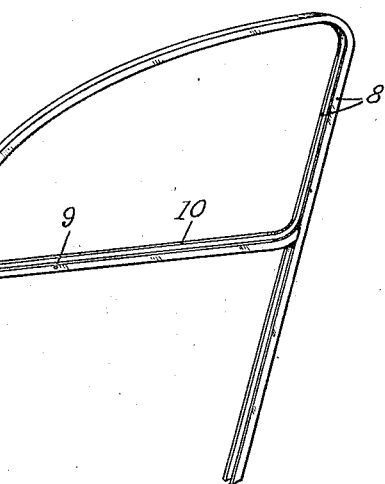
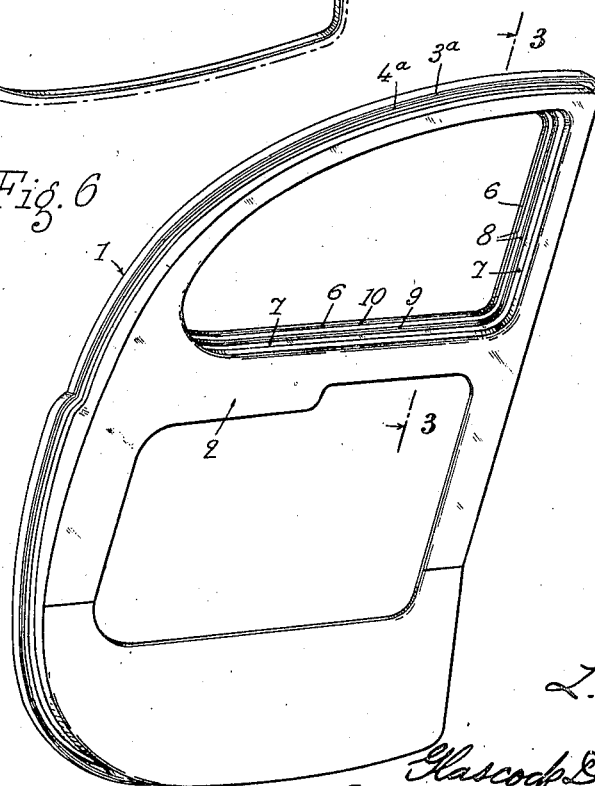

Patented Apr. 1, 1941

2,236,827

UNITED STATES PATENT OFFICE 2,236,827

VEHICLE DOOR

Léon Mollet, Asnieres, France, assignor to Societe Anonyme des Usines Chausson, Asnieres, Seine, France Application June 9, 1937, Serial No. 147,344
In France June 17, 1936

1 Claim. (Cl. 296—44)

The metallic doors for motor vehicles and the like consist essentially of two pressed panels forming the inner and outer faces of the door. In the usual methods of construction, these panels are joined together by folding the edge of the outer panel about the edge of the inner panel by means of a pneumatic hammer. The door thus has a thin edge, upon which it is not an easy matter to mount a packing.

On the other hand, the window opening of the door is bordered directly by the edges of the corresponding openings formed in the two panels and thus the said edges cannot remain in the rough state after punching, and must be bent over towards the inside while leaving a passage for the glass pane, thus requiring additional operations which greatly increase the cost price of the door.

One object of the present invention is to provide a new metallic door construction for motor vehicles and the like, in which the edge portions of the inner and the outer pressed panels are placed in contact and joined together by spot welding for example, and are then bent at an angle upon the whole or a part of the periphery of the door in order to form a peripheral channel groove adapted to receive a packing band.

According to a further feature of the invention, the edges of the openings in the inner and outer pressed panels, which serve to form the window, remain in the rough state as they are left after the punching process, and a channel bar is secured between the upper edges and between the lateral edges of the two panels, and to the lower edge of both panels are secured flat bars leaving between them a space for the passage of the glass pane, the said channel bars and the flat bars being provided with section pieces of rubber or the like, for packing purposes.

In the accompanying drawings, which are given solely by way of example:

Fig. 1 is a vertical longitudinal section, of a very diagrammatic nature, showing the two inner and outer pressed panels of the door which are simply placed together, before joining.

Fig. 2 is a like view, with the two members joined together.

Fig. 3 is a partial section on a larger scale, after the assembling, on the line 3—3 of Fig. 6.

Fig. 4 is a perspective view of the outer pressed panel alone, said panel being shown with the flange such as it is formed after having been secured to the inner pressed panel.

Fig. 5 is a perspective view showing the channel bar and the two flat bars employed for the window.

Fig. 6 is a perspective view showing the metallic assemblage forming the door, but freed from its various furnitures and its peripheral packing band.

In the embodiment herein represented, the door consists essentially of a pressed metallic panel 1 which is adapted to form the outer face of the door, and of a second pressed panel 2 which is adapted to form its inner face.

The said panels 1 and 2 comprise, upon their entire periphery, edge portions 3 and 4 (Fig. 1) having the same width, this being greater than that of the edges of the pressed panels in current use. The edges 3 and 4 are such that they will fit exactly upon each other, as shown in Fig. 1. The two pressed panels are joined together by a suitable number of electric welding spots between the edges 3 and 4, after which these edges are bent at an angle, as shown in Figs. 2, 3 and 6. For this purpose, use is made of any suitable press, in such way that the operation is effected by a single movement, without any danger of distortion, as is the case with the usual construction, in which the edge of the outer pressed panel is folded about the edge which is less wide, of the inner pressed panel, at successive points by means of a pneumatic hammer.

After this operation, the door has a groove in its inner face, around the whole periphery, and in this groove is placed a band 5 (Figs. 2 and 3) of rubber or like material, which is adapted to form a packing member when applied against the door frame.

In each of the two pressed panels is in an opening adapted to form the window part, but whereas in the usual doors, the edges 6—7 of such openings are bent down, in the present case they are preserved just as they are left after the pressing process, being thus parallel with the two pressed panels. Between these edges 6—7 is mounted a channel bar 8 which surrounds the window on the upper side and the two lateral sides.

On the lower side of the window, the section piece 8 is replaced by two flat bars 9—10, which are secured respectively to the outer pressed panel 1 and to the inner pressed panel 2. Between these two bars 9—10 is a passage for the glass pane 11 (Fig. 3). The channel bar 8 and the bars 9—10 are respectively provided with a packing member 12 and with packing members 13 and 14 (Fig. 3), consisting of rubber or like material. Use is also made of auxiliary packing members 15, of felt or the like.

The assembling of the parts of the window offers no difficulty; the channel bar 8 and the bars 9—10 are secured by welding to one of the pressed panels, for instance the inner pressed panel 2, before it is joined to the other pressed panel, and after the two panels 1 and 2 have been joined together, they are welded to the other panel.

As will be observed, the invention permits of obtaining, in particularly simple conditions, a door of a most resistant nature, without distortion, and providing for a very tight fit between the door and its frame.

Obviously, the invention is not limited to the embodiment herein described and represented, which is given solely by way of example.

Having now described my invention what I claim as new and desire to secure by Letters Patent is:

In a metallic vehicle window construction an outer panel and an inner panel, both having registering openings therein, the margins of the two openings being spaced from each other as to afford room for a window pane, flanges formed on said panels along the margins of the openings, the flanges being arranged substantially parallel to the main plane of the frame and being directed toward the center of the opening, a resilient weather strip inserted between the margins of the openings in the two panels and being adapted to receive a window pane, said weather strip being provided with means adapted to overlap and to engage the flanges of both said panels as to hold the strip in place and to cover the edges of the flanges.

LÉON MOLLET.